3,175,324
FISHING LURE
Curtis R. Blackwell, 425 W. Quill Drive,
San Antonio, Tex.
Filed Jan. 8, 1964, Ser. No. 336,457
3 Claims. (Cl. 43—42.03)

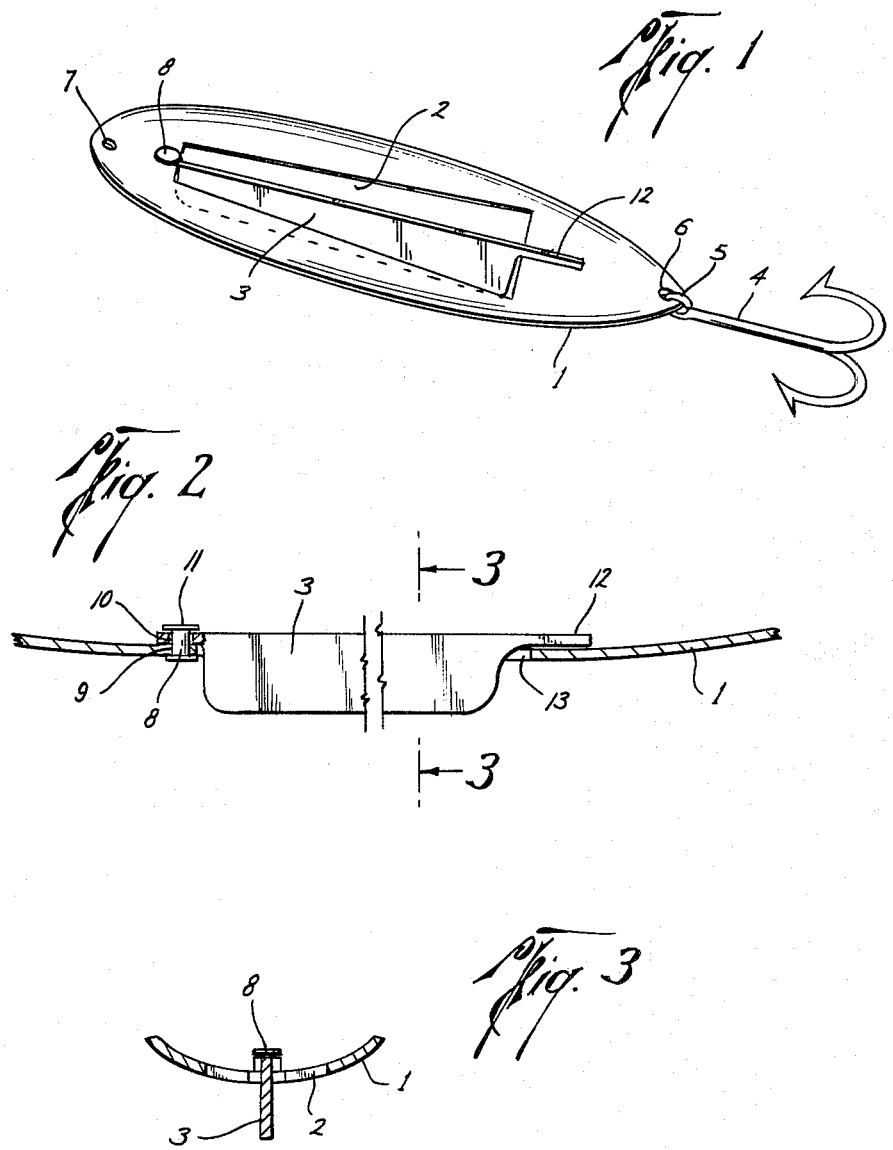

This invention relates to fishing lures and is particularly concerned with an improvement in spoon type lures adapted to generate attracting sounds and reflections.

Although the art abounds with spoon lures having large central openings within which various kinds of flashers (i.e. swingably carried light reflecting members) are carried, the known lures of this type do not, in various aquatic environments, achieve their full potential. However, it has been discovered that the attractive potential of such lures can be significantly improved by constructing such lures in accordance with the present invention.

In general, this invention comprises a spoon-flasher lure construction wherein the spoon and flasher are so positionally related that the flasher remains in constant upstanding position relative to the flat surface of the spoon and the free end of the flasher will reciprocally strike opposite lateral edges of the spoon opening in response to relative movement between lure and water.

More particular illustration of the present invention may be had by reference to the accompanying drawings wherein there is illustrated one particular construction of a spoon-flasher lure embodying one form of the improvement which the invention embraces.

In the drawings:

FIGURE 1 is an isometric view of one construction embodying one form of the improvement of this invention.

FIGURE 2 is an enlarged fragmentary side view of the construction shown in FIG. 1 and is partly in elevation and partly in section.

FIGURE 3 is a section view taken along line 3—3 of FIG. 2.

In the illustrated embodiment, one end of a conventional spoon member 1 is outfitted with a line-receiving eye 7 to which a fishing line may be tied in the usual manner. The other end of spoon 1 is outfitted with a hook-receiving eye 6 to which a hook may be attached as by means of ring 5 of hook 4.

Spoon 1 is also provided with an elongate passageway 2 which is preferably relatively large (i.e., extending more than half the length and about half the width of spoon 1) to facilitate good sinking characteristics.

At one end of passageway 2, preferably the end adjacent the line-receiving end of spoon 1, one end of a flasher 3 is pivotally connected to spoon 1 as by means of passing a pin 8 through eye 9 of spoon 1 and eye 10 of flasher 3 and then impacting the opposite ends of pin 8 to provide upsets 11. When so connected, flasher 3 will be constantly held within passageway 2 and in upstanding relation to spoon 1. Thus, when there is relative movement between lure and water, the free end of flasher 3 will reciprocally traverse passageway 2 to create attraction with a continuous though variegated reflection pattern on each of its faces and an attractive clicking noise each time flasher 3 strikes one of the lateral edges 13 of passageway 2.

Additionally, a projection 12 is provided at the free end of flasher 3 and slidably overlies spoon 1 to provide further upstanding support of flasher 3, further attractive sound generation by reason of the scraping action between projection 12 and spoon 1, and additional attractive reflection from the mirror-reflective effect between the coacting surfaces of projection 12 and adjacent portions of spoon 1.

In construction of lures embodying this invention, it is recommended that spoon and flasher both be chrome-plated or equivalently surfaced for best results and longest life. Size, of course, is a matter of choice but is expected to range from about ⅛ ounce to several ounces as is conventional for fresh and salt water fishing. Moreover, while maintenance of the upstanding relation of flasher to spoon is achieved in the illustrated embodiment by means of pin 8, various other upstanding means, as for example, integral extensions of either spoon 1 or flasher 3 or other equivalent means, may be employed with equal efficacy.

It is to be understood that the foregoing description of that particular embodiment of this invention which is illustrated in the accompanying drawings is given solely to facilitate comprehension of the invention by those skilled in the art. Accordingly, said description may not be taken as limiting of the invention itself which will admit of other and equally operable embodiments.

What is claimed is:
1. A fishing lure comprising:
   an ovoid spoon having forwardly and rearwardly disposed means for permitting the attachment thereto of a fishing line and a fishing hook, respectively;
   said spoon having an elongate centrally disposed longitudinally extending opening;
   a plate-like flasher disposed in said elongate centrally disposed longitudinally extending opening and projecting for a material distance from the bottom of said spoon;
   said plate-like flasher being anchored at its forward end to a pivot and limited to solely transverse swinging movement with respect to the major plane of said plate-like flasher;
   the rearward portion of said plate-like flasher being adapted to swing into contact with the rearward portions of the side edges of said elongate centrally disposed longitudinally extending opening of said spoon.
2. The fishing lure of claim 1, wherein
   said flasher is provided with an extension which slidably engages the upper surface of the rearward portion of said spoon.
3. The fishing lure of claim 1, wherein
   the side walls of said elongate centrally disposed longitudinally extending opening are rearwardly divergent.

References Cited by the Examiner
UNITED STATES PATENTS

| | | | |
|---|---|---|---|
| 1,778,214 | 10/30 | Fisher | 43—42.03 |
| 1,914,211 | 6/33 | Novitzky | 43—42.5 X |
| 1,925,197 | 9/33 | Maynard | 43—42.03 |

SAMUEL KOREN, Primary Examiner.
ABRAHAM G. STONE, Examiner.